United States Patent [19]
Sheldon et al.

[11] 4,357,902
[45] Nov. 9, 1982

[54] SYSTEM FOR HOLDING AND TRANSPORTING LOBSTERS

[75] Inventors: William W. Sheldon, R.F.D. #2, Box 292, Ellsworth, Me. 04605; Theodore G. Axford, Milbridge, Me.

[73] Assignee: William W. Sheldon, Marlboro, Me.

[21] Appl. No.: 284,629

[22] Filed: Jul. 20, 1981

[51] Int. Cl.³ .............................................. A01K 61/00
[52] U.S. Cl. ............................................ 119/2; 119/3
[58] Field of Search .............................. 119/2, 3, 4, 5; 414/422, 423

[56] References Cited
U.S. PATENT DOCUMENTS

| | | | |
|---|---|---|---|
| 1,512,591 | 10/1924 | Friedrichs | 119/3 |
| 2,302,336 | 11/1942 | Macdonald | 119/2 |
| 3,727,579 | 4/1973 | Lee | 119/2 |
| 3,815,546 | 6/1974 | Plante | 119/2 |

Primary Examiner—Hugh R. Chamblee
Attorney, Agent, or Firm—Daniel H. Kane, Jr.

[57] ABSTRACT

A specially adapted container for transporting lobsters or other marine organisms in an aerated water environment is in the basic configuration of a drum housing with removeable cover and vent hole. A low pressure air diffuser is positioned in the drum housing at the base for releasing diffuse low pressure air into sea water contained in the drum. Air coupling for delivering low pressure air to the diffuser is provided along with inlet and outlet openings for circulating fresh sea water in lieu of diffuser aeration. Different covers for the container may be provided for loading by the fisherman and for subsequent transport. The invention further includes a complete system for containerized transport of lobsters by truck or other vehicle in the aerated water environment provided by the containers. The method of the invention provides for handling and transporting lobsters in aerated sea water from a boat at the dock to a lobster pound or similar destination. The method may be completely automated as disclosed. Injury to the lobsters and consequent shrinkage of pounded lobsters live stored for long periods of time is effectively eliminated.

31 Claims, 8 Drawing Figures

FIG I

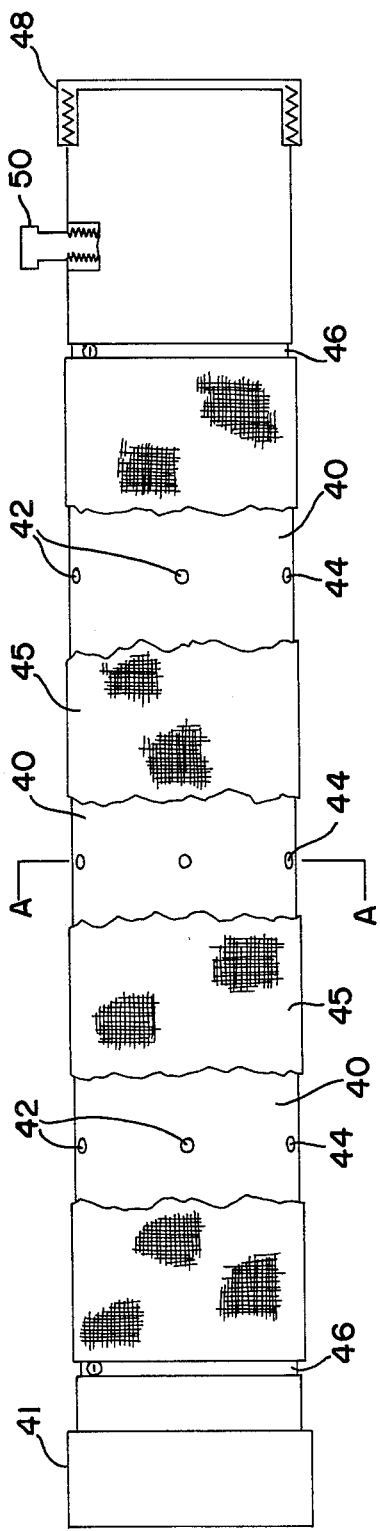
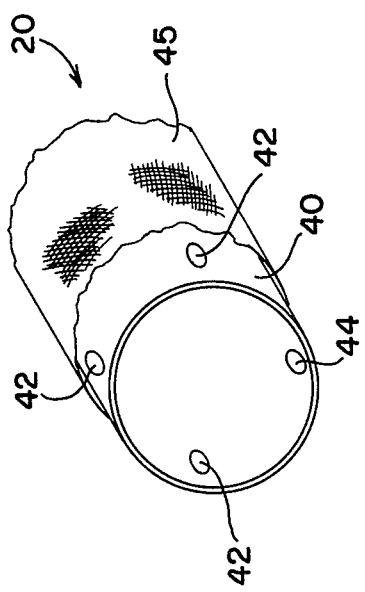
FIG 3
FIG 3A

SYSTEM FOR HOLDING AND TRANSPORTING LOBSTERS

FIELD OF THE INVENTION

This invention relates to a new method and apparatus for holding and transporting lobsters and similar sea creatures while immersed in aerated sea water. The invention is particularly applicable for transporting lobsters from the lobster boat or dock to a lobster pound and for stocking such pounds for long term storage of the lobsters. The method and apparatus minimize the stress and injury from handling and reduce the losses of lobsters pounded for long periods of time.

BACKGROUND OF THE INVENTION

A significant percentage of lobsters from the summer and fall catch each year are "pounded" or stocked in lobster pounds. As many as 100,000 lobsters may be live stored in a single pound for many months. The lobsters are fed until they become more or less dormant in the cold weather. Then during the late winter months when the market is favorable, the pound owner begins retrieving the lobsters for sale and shipment. A problem often encountered is that the pound owner may discover a mortality as great as 20% of the lobsters placed in the pound.

The present inventors have discovered from sustained observation in the marine environment of lobster pounds that stress and injury to which the lobsters are subjected in handling during transport to the lobster pound are major causes of such losses. According to conventional methods for stocking lobster pounds the lobsterman or fisherman with lobsters in a live holding tank onboard the boat arrives at the dock for unloading. Fresh seawater is circulated through such live tanks to maintain the health of the day's catch while held on the lobster boat or fishing boat.

The trouble begins when the lobsters leave the boat. The lobsters are picked out one at a time and placed together in a wire basket for weighing. The lobsters are then packed dry in wooden crates for shipment to the pound. Alternatively the lobsters may be held temporarily in a tank to be bailed out later and packed into the wooden crates for shipment. Each time the lobsters are handled and packed together out of water there is physical damage from puncture wounds. The horny projections on the lobsters' claw joints and the rostrum which projects like the horn of a unicorn, are needle sharp. When a lobster is punctured it bleeds a clear liquid blood which can cause immediate weakening and delayed death several days or as much as several weeks later.

Furthermore, lobsters derive their necessary oxygen from the water through gills. It is only the moisture on the gills which keeps the lobsters alive during transport in the conventional wooden crates. The longer the lobster is out of water the greater is the anoxic stress and the more it is weakened and susceptible to disease. When the lobsters arrive at the pound they are indiscriminately dumped in the water or unpacked and thrown in one at a time.

In the weakened condition a significant percentage of the lobsters are susceptible to Gaffkemia bacteria and develop "red tail disease". It is also the weakened lobsters that are cannibalized by their healthy neighbors further spreading the disease. Thus, the physical damage and oxygen deprivation during handling and transport are the major causes of shrinkage among the pounded lobsters.

It is particularly important that lobster destined for long term pounding and storage be in the best possible condition and free of the stresses of oxygen deprivation and physical injury. Lobsters headed for the consumer within a few days of shipment may be shipped by the conventional methods, as the longer term effects of such stresses are of no import. It is now apparent, however, that the conventional methods of holding and transporting lobsters are entirely inappropriate for lobsters to be pounded and live stored over long periods of time.

Another disadvantage of the conventional method for handling and transporting lobsters is the number of manual handling steps and the amount of time required. This time consuming method causes back up delays at the unloading dock when the boats arrive at once, and increased costs of handling.

OBJECTS OF THE INVENTION

It is therefore an object of the present invention to provide a new method and system for holding and transporting lobsters, particularly from the unloading dock to a lobster pound for long term storage, which effectively reduces the loss or shrinkage of pounded lobsters to zero.

Another object of the invention is to minimize or eliminate the stresses of handling, physical injury, puncture wounds, and oxygen deprivation suffered by lobsters during handling and transport. According to the invention the benign elements of the normal marine environment are simulated during holding and transport.

A further object of the invention is to provide a complete and substantially automated system for holding and transporting lobsters between the lobster boat or unloading dock and the lobster pound which effectively eliminates manual handling of the lobsters once they are caught by the lobsterman. The system is intended to include individual containers particularly suited for holding and transporting lobsters in the safe and healthful conditions afforded by aerated seawater.

Furthermore in applicants' copending U.S. patent application Ser. No. 246,599 filed Mar. 23, 1981 and entitled RETRIEVAL OF LOBSTERS & OTHER OBJECTS, applicants have disclosed a system and method for retrieving and recovering lobsters after they have been stocked in a lobster pound. According to the invention in this disclosure the trauma and injury and hence loss of lobsters suffered during retrieval from the pound by conventional methods is effectively eliminated. The "hydraulic" method of handling set forth in that patent application accomplishes this by avoiding the mechanical contacts and stresses of conventional methods. It is an important object of the present invention to complement this retrieval method by providing a new method and apparatus for stocking the pound in the first instance which eliminates losses incurred by conventional holding and transport. The present invention prevents such losses and avoids conditions leading to losses and shrinkage at the outset of the pounding cycle. Overall the shrinkage from stocking and retrieval during the pounding cycle is essentially eliminated.

SUMMARY OF THE INVENTION

In order to accomplish these results the present invention provides a specially adapted container for transporting lobsters or other marine organisms in an aerated sea water environment. The container may be in the basic configuration of a drum housing or drum with water tight base and side walls, and a removable cover formed with a vent hole. A low pressure air diffuser is positioned in the drum housing at the base for releasing diffuse low pressure air into sea water contained in the drum. Each drum is provided with a first air coupling for delivering low pressure air to the diffuser. The drum is also formed with inlet and outlet openings at respective spaced apart locations with fittings for coupling and circulating sea water through the drum. A feature and advantage of this arrangement is that aerated seawater may be provided either by releasing diffuse low pressure air into sea water held in the drum or container, or by continuously circulating fresh sea water through the drum.

The invention contemplates a number of features and variations for the basic container for containerized shipping of lobsters in the aerated sea water environment. For example, the removable cover may be secured to the drum with a ring clamp, and formed with a vent hole in the center to minimize sloshing of water in the container through the vent hole. Air coupling to the diffuser may be through an air hose coupled at one end to the diffuser and at the other end extending through the vent hole for coupling to a compressor. Furthermore, a second cover may be provided for replacing the removable cover, formed with a central hole large enough to receive lobsters or other sea creatures to be held in the container. The later second cover may be used by the lobsterman on the fishing boat while the former cover with small vent hole is used during transport.

The low pressure air diffuser positioned in the base of the container may assume a variety of forms. Thus an air diffuser in the form of a porous or perforated material in a tubular configuration closed at one end may be used. For example a porous stone diffuser or a porous polyester diffuser may be used. Alternatively, the low pressure diffuser may comprise a length of plastic pipe having perforations formed along a portion thereof and a sleeve of heavy duty fabric material secured at each end to the pipe over the perforated portion for diffusing and releasing air received through the perforations.

Preferably, the air coupling for each container comprises an air hose coupled at one end to the tubular or pipe configuration low pressure air diffuser. The air coupling hose is of smaller diameter than the tubular or pipe configuration air diffuser. This restrictive diameter maintains low level back pressure in the diffuser. A feature and advantage of this arrangement is that substantially even and constant air pressure can be maintained in the containers despite relative tilting and change of elevation during transport, for example, on the flat bed of a truck moving over hilly terrain.

For the system of containerized transport of lobsters in an aerated water environment, the invention provides a plurality of such containers suitable for transport on the flat bed of a truck or other vehicle. The truck or vehicle is outfitted with a low pressure aeration compressor and air distribution system including a plurality of second air couplings complementary to the first air couplings of the plurality of containers. Low pressure air less than one atmosphere and preferably in the range of approximately 3½ p.s.i. or less is continuously supplied to the containers supported on the flat bed of the vehicle.

According to the invention the truck or other vehicle is also outfitted with a pivotable boom or swivel crane and hoist for lifting containers onto and off the bed of the truck. The boom and hoist include a barrel or drum inverter with saddle and pivot mechanism for controlled dumping of the contents of the containers after the cover of a container has been removed. The vehicle may also include a sea water pump and suction inlet for drawing in sea water, and an outlet hose and fitting for coupling to a container on the vehicle for filling the container with sea water. A weighing scale may also be provided for weighing the lobster catch before immersion in sea water for holding and transport.

According to the general conception of the invention the method for handling and transporting lobsters in sea water from a boat at the dock to a lobster pound or similar destination contemplates providing a plurality of drum-like containers for holding and transporting the lobsters when a lobster boat or fishing boat is ready for unloading at the dock; filling the containers with sea water and loading the lobsters into the containers; and aerating the sea water in each container with diffuse low pressure air while the lobsters are held and transported in the containers. The method of the invention further contemplates transporting the containers to a lobster pound or similar destination, lifting each container and lowering the container to the surface of the water, and upending the container and emptying the lobsters or similar contents into the pound. A feature and advantage of this method is that the lobsters are immersed in aerated sea water during handling and transport from the dock to the lobster pound.

According to a more completely containerized and automated method the invention includes the steps of placing the container on the lobster boats or fishing boats themselves and filling the containers with sea water; placing the lobsters as they are caught by the lobsterman into the containers; and circulating fresh sea water through the containers while they are held on the lobster boat or fishing boat. When the boat returns to the dock for unloading the containers are drained and then lifted from the lobster boats. According to the invention further steps are contemplated of weighing each drained container and subtracting the weight of the container for determining the weight of lobsters in each container, then refilling each container with sea water after weighing, and coupling the containers to the low pressure air distribution system of the vehicle for aeration while the containers are transported on the truck or other vehicle. The method thereafter follows the steps for unloading and stocking at the pound as set forth above.

A feature and advantage of the method and apparatus of the present invention is that physical injury and puncture wounds caused by dry packing of the lobsters together is eliminated because of the buoyant and cushioning effect of the sea water in which the lobsters are immersed. Furthermore the lobsters are not subjected to oxygen deprivation. The lobsters therefore arrive at the pound in a healthy state without weakening and susceptibility to "red tail disease" and cannibalism. By the overall method and system shrinkage of pounded lobsters live stored for long periods of time, caused by conventional handling and transport methods, is effectively eliminated.

Other objects features and advantages of the present invention will be apparent in the following specification and accompanying drawings.

BRIEF DESCRIPTION OF THE DRAWINGS

FIG. 3 is a detailed side view of one type of low pressure air diffuser suitable for mounting and use in the container while FIG. 3A is an end cross section of the diffuser.

DESCRIPTION OF PREFERRED EXAMPLE EMBODIMENT & BEST MODE OF THE INVENTION

Figure 1:
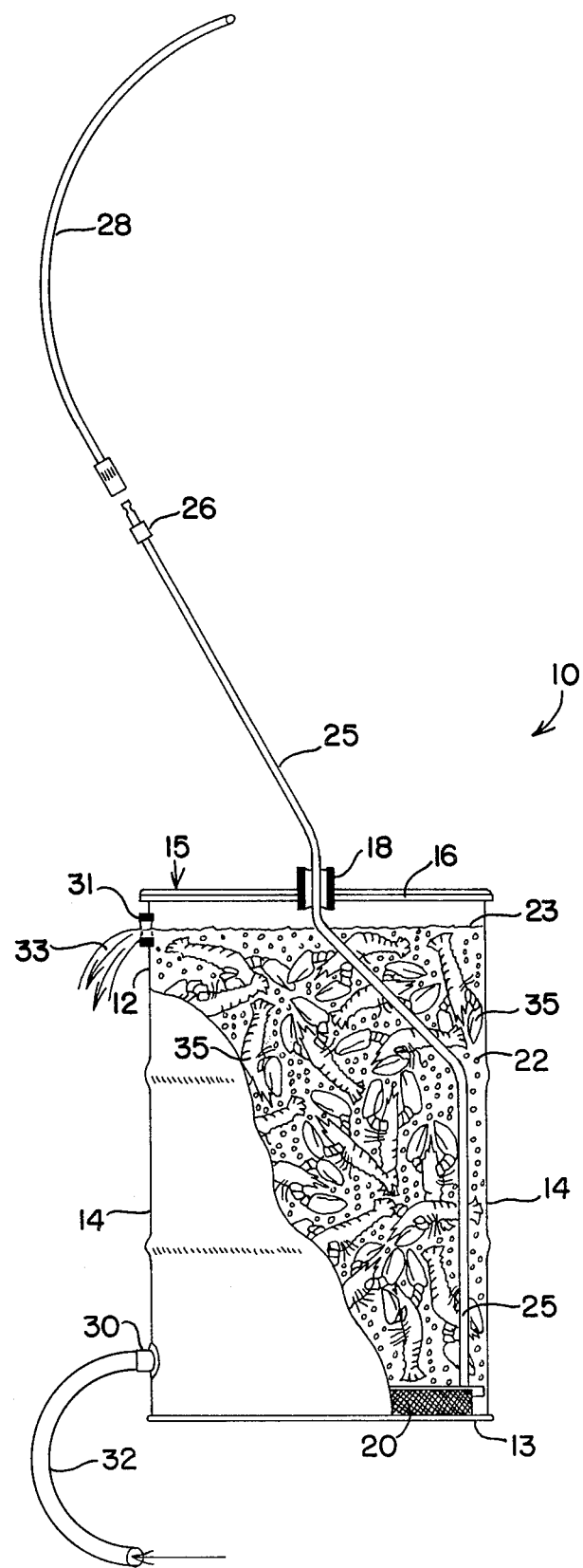
FIG. 1 is a side view in partial cross section of a lobster holding and transport container according to the present invention.
Figure 2:
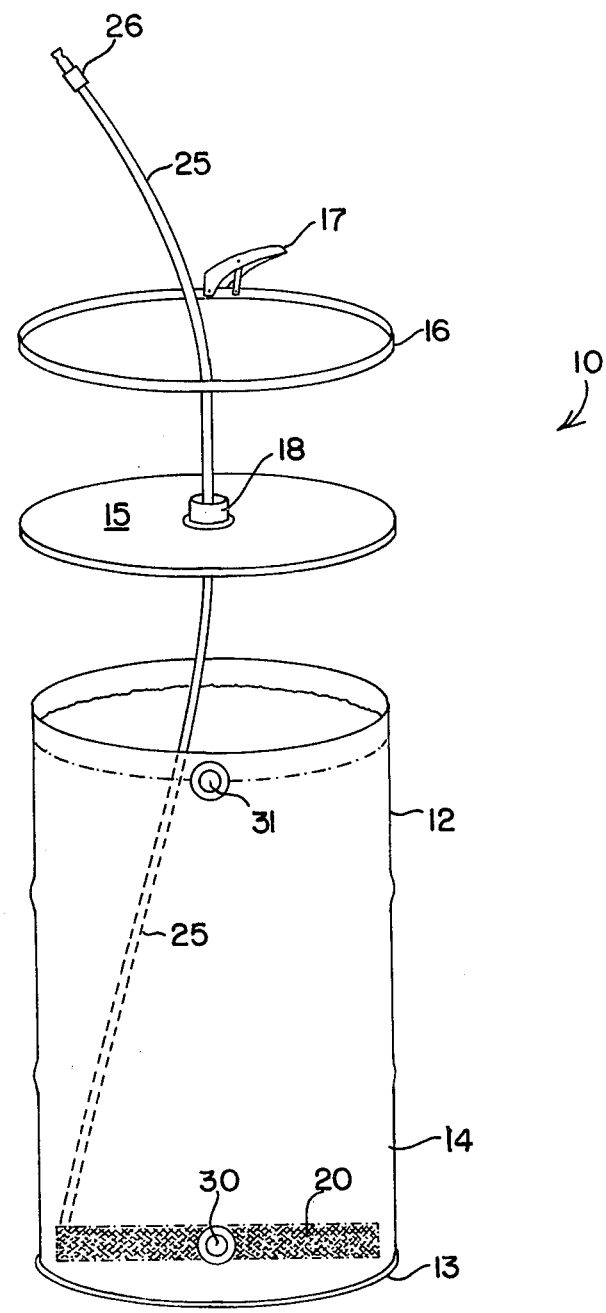
FIG. 2 is an exploded perspective view of the container showing the drum housing and operative components.

A lobster holding and transport container according to the present invention is illustrated in FIGS. 1 and 2. The container 10 is formed by a drum housing 12, in this example a 55 gallon (209 liter) drum modified in accordance with the invention. The drum housing 12 includes water tight base 13 and sidewalls 14, and a removable cover 15 which may be secured to the rim of the drum by a clamp ring 16 having a lever clamp 17. The cover 16 is provided with a vent hole 18, such as, for example a 2" (5 cm) pipe nipple vent, located at the center of the cover to minimize water loss from sloshing Inside the drum housing 12 and mounted at or adjacent the base 13 is a low pressure air diffuser 20 for delivering and distributing low pressure air 22 through sea water 23 contained in the drum housing. An air coupling in the form of an air hose 25 is provided coupled at one end to the diffuser 20, with the other end of the air hose 25 extending through the air vent hole 18 formed in the cover of the container. The air hose 25 includes at the outer end a quick disconnect coupling or fitting 26 for rapid coupling to a source of low pressure air through the second air coupling and hose 28 which may be part of the air distribution system of a transport vehicle as hereafter described.

The drum housing 12 also is formed with an inlet hole and coupling 30 and outlet hole and coupling 31 at spaced apart locations on the drum housing for coupling hoses 32 and 33 to the inlet and outlet for circulating fresh sea water through the container. The outlet opening 31 also serves as an overflow outlet.

In operation the drum housing 12 is filled to the overflow hole 31 with sea water and the container is filled to the top with lobsters 35 so that the lobsters are in close proximity but still protected from puncturing and physically injuring each other by the buoyant cushioning of the water. Lobsters are placed in the drum with cover 15 removed or with a substitute cover in place having a central hole large enough to receive the lobsters as hereafter described. As shown in FIGS. 1 and 2, the drum housing 12 is not compartmentalized or subdivided so that lobsters may be unloaded without individual manual handling by upending the container 10 and dumping the contents all as hereafter described.

Aeration of the sea water in the container 10 is maintained from the outset. As soon as the container is filled with water for transport of lobsters, the air coupling hose 25 is coupled to the second air coupling 28 from the low pressure air distribution system at the dock or on the vehicle as hereafter described. Diffuse low pressure air is distributed by the diffuser 20 through the seawater as soon as lobsters are immersed in it. Alternatively, when the container 10 is used directly on a lobster boat or vessel, the lobsterman of fisherman couples his sea water circulating system through the inlet and outlet openings 30 and 31 for continuous circulation of fresh sea water through the container with the same effect as continuous aeration. From the time of capture to delivery, oxygen deprivation can therefore be avoided. Furthermore, by continuous immersion in water without dry packing, the puncture wounds and physical injuries typical of conventional handling methods are also avoided.

For the low pressure air diffuser 20 at the base of the container 10 a porous material in a tubular configuration may be used. Thus, a porous stone tube of the type used in aquaria may be used though the stone tends to be fragile and subject to breakage. Preferably, a porous polyester air diffuser may be used of the type which may be obtained from Wolf Marine Systems, Brooklyn, N.Y. Thus, an air diffuser of porous polyester material in tubular or pipe configuration provides greater durability in the lobster filled container.

Yet another example of a low pressure air diffuser according to the present invention is illustrates in FIGS. 3 and 3A. As there shown, the diffuser 20 is formed by a section of plastic pipe 40 such a PVC pipe of length short enough to fit horizontally across the base of the drum housing 12. Such a drum is typically 2' (61 cm) in diameter, and a pipe length of for example 18" (46 cm) would be suitable. The pipe length 40 is capped at one end by PVC cap 41. Along a portion of the length of pipe perforations or small holes 42 and 44 are formed around the circumference of the pipe. In this example 4 holes are proved around the circumference of the pipe at each of three locations along the pipe. The hole 42 on the sides and upper portion of the pipe serve as air outlet holes for delivering low pressure air. The lower holes 44 in the bottom of the pipe also serve the function of purging water from the pipe when pressurized air is coupled to the diffuser through the air coupling hose 25.

The portion of perforated pipe 40 in which the holes 42 and 44 are formed is covered by a fabric diffuser sleeve 45 clamped at each end to the circumference of the pipe by clamps 46 which may be for example stainless steel or plastic clamps or heavy duty tape. The fabric sleeve is formed of a heavy duty porous fabric material such as flexible polyester fabric, for example fire hose jacket. The diffuser fabric sleeve operates to deliver and distribute air received through the perforations 42 and 44 and break up the air into a multitude of tiny bubbles for more efficient low pressure aeration of the sea water in the container.

The diffuser 20 may be mounted at or adjacent the base of the drum housing at, for example a threaded fitting 48 secured to the bottom of the side wall of the drum. Between the end of the fabric sleeve 45 and the mounting fitting 48 is provided a fitting or coupling 50 in the pipe 40 for attaching the air coupling hose 25 to the air diffuser. Thus, a source of air can be readily coupled to the container system by way of the air coupling hose 25 secured to the air diffuser 20 at fitting 50 and accessible at the other end by extending through the air vent 18.

Figure 4:
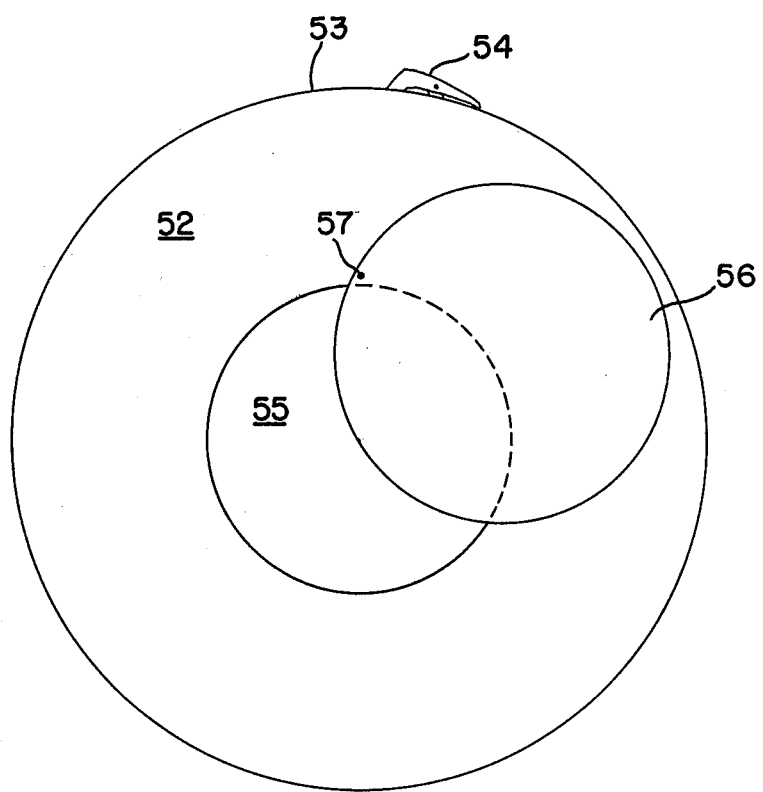
FIG. 4 is a plan view of second cover for use with the container to replace the cover illustrated in FIG. 2 when the container is used directly on a lobster boat or fishing boat.

An alternative cover or second cover 52 for use on the container during loading of lobsters into the container is illustrated in FIG. 4. This second cover is also secured to the rim of the drum by a snap ring or clamp ring 53 with lever arm 54. This cover differs however in being formed with a large central hole 55 large enough to receive lobsters or similar creatures from the sea. In order to prevent sloshing of water when the central hole is not being used, a pivotally mounted or swivel mounted lid 56 is provided secured at pivot point 57 for rotation between a closed position covering the central hole 55, and an open position for access and loading of lobsters into the container. Thus, while the container may be loaded and used by the lobsterman or fisherman with the cover completely removed, this second cover with large central hole may also be used for access to the container while minimizing sloshing. During the subsequent transport and shipping of the containers, the first removable cover 15 with small vent hole 18 would be replaced and secured over the drum.

According to one feature of the invention the air coupling lead hose 25 is of considerably smaller diameter than the diameter of the diffuser pipe 40. For example and air hose lead of ¼" (0.6 cm) may be used with a diffuser pipe diameter of 1½" and 2" in diameter (3.8–5 cm). Such a relative sizing of the air passageways provides a restriction to effect back pressure in the diffuser pipe section to assure a constant and even pressure at the diffuser despite variations in the angle of tilt or elevation of the container relative to other containers coupled to a common air distribution system on a transport vehicle as hereafter described.

By low pressure air in the present context is meant air pressure which does not exceed pressure of one atmosphere. Preferably the low pressure air delivered to the diffuser is in the range of 2 to 5 p.s.i. Typically, 3½ p.s.i. is used in the preferred example embodiment. Flow rates for delivery of air through the diffuser range up to 1 to 2 cubic feet per minute. With an entry orifice of 1/16th of an inch diameter at the coupling 50 into the air diffuser and with air pressure at approximately 2 p.s.i. an air flow approaching 2 cubic feet per minute can be achieved although 1 cubic foot per minute has been found more than adequate for the 55 gallon drum sized container. Excess air flow at the low air pressures involved does not present any problem for the lobsters as supersaturation of the sea water cannot occur at these low pressures.

Figure 5:
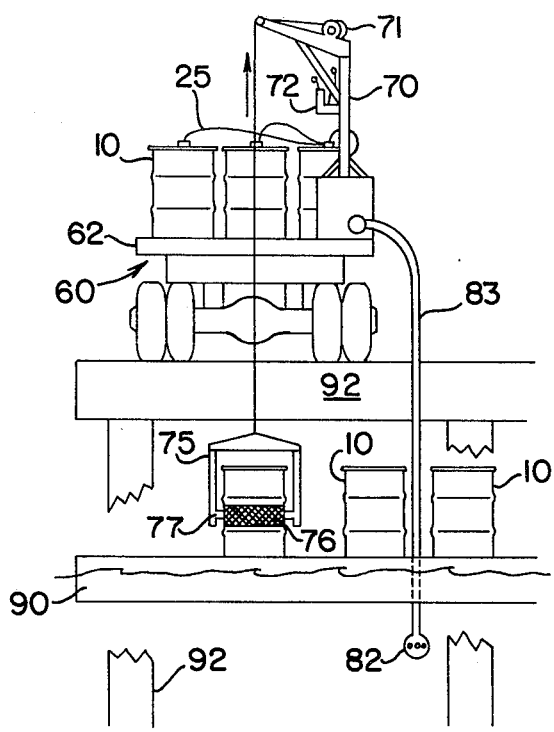
FIG. 5 is an end view of the system for holding and transporting lobsters in operation at a lobster buying wharf during unloading of the lobster boats and loading of the transport vehicle.
Figure 6:
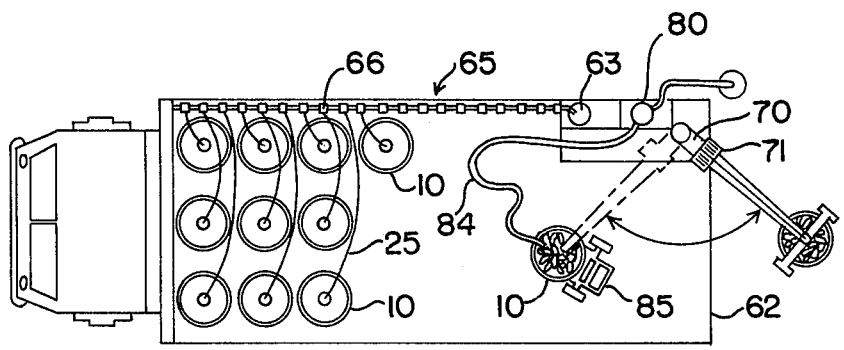
FIG. 6 is a plan view from above of the lobster holding and transport system showing the operative relationship between the plurality of containers and transport vehicle.
Figure 7:
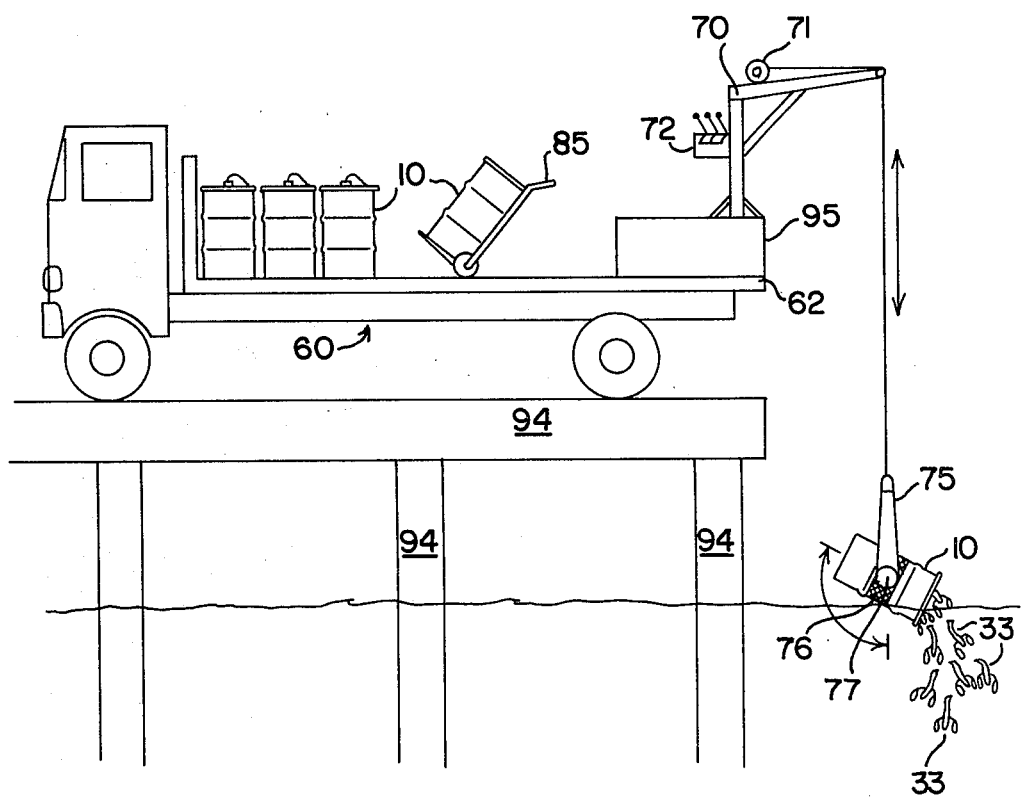
FIG. 7 is a side view of the system for holding and transporting lobsters in operation at the lobster pound wharf during unloading of the lobsters from the transport vehicle and stocking of the lobster pound.

A complete system for holding and transporting lobsters in aerated sea water from the lobster boat to the lobster pound is illustrated in FIGS. 5–7. The system includes a plurality of containers 10 of the type described with reference to FIGS. 1 and 2 and a transport vehicle such as truck 60 with a flat bed 62 for supporting and carrying the containers 10. Along one side, the truck is provided with an air compressor pump 63 and an air distribution system 65 including a plurality of secondary air couplings 66 which may include a secondary hose 25 to which the primary air hose couplings 30 from containers 10 may be coupled for receiving the low pressure air provided by compressor 63. The air compressor 63 provides low pressure air at less than one atmosphere pressure and typically 2 to 5 p.s.i. Since the 55 gallon drum containers are three feet high, two pounds per square inch air pressure is sufficient to deliver the low pressure air to the diffuser at the bottom of the container when the container is full. An air pressure of 3½ p.s.i. is generally used in the preferred example embodiment.

The truck 60 is also outfitted with a swivel crane or pivoting boom 70 including an electric hoist 71 and controls 72 for controlling the rotational position of the crane 70 and for operating the electric hoist 71. The boom and hoist assembly also includes a drum emptying device or inverting drum dumper 75. The inverting drum dumper 75 includes a saddle 76 for securing the container drum 10 around its circumference near the center of gravity of the container and a pivot mechanism 77 for inverting the container drum 10 under operation of the controls 72.

The truck is also provided with a sea water pumping system including water pump 80, sea water suction inlet 82 and sea water suction inlet hose 83. The pump 80 draws in sea water through suction inlet 82 and hose 83 and delivers the sea water through outlet hose 84 which is coupled to one of the openings formed in container 10 for filling the container with sea water after it is positioned on the flat bed 62 of truck 60. A hand truck 85 may also be provided for efficiently positioning the containers 10 at desired locations on the flat bed 62.

In operating the system according to the method of the present invention lobsters are first unloaded from the lobster fishing boat or floating platform 90 and loaded onto the vehicle 60 for transport to the lobster pound. As shown in FIG. 5 the transport vehicle 60 backs into position at the end of the lobster buying and loading wharf 92 where the lobster boat or floating platform 90 is docked for unloading. Typically the containers 10 according to the present invention which are loaded with lobsters have been drained for weighing. The drained containers 10 full of lobsters are weighed at the lobster boat 90, the wharf 92, or the vehicle 60 and the known weight of the container is subtracted to yield the net weight of the lobsters.

The drum dumper harness or saddle mechanism 75 is secured in turn to each of the container drums and the containers are lifted to the flat bed 62 of the transport vehicle or truck. As shown in FIG. 6 once lifted to the flat bed of the truck the containers 10 are filled with sea water by hose 84 and sea water pump 80. The containers are filled nearly to the top to minimize the air space and consequent sloshing of water. The containers are then placed in orderly columns and rows with the respective first air coupling hoses 25 coupled to the secondary couplings 66 of the air distribution system 65 mounted along the side of the truck 60. Thus immediately upon picking up the lobsters from the lobster boat, the lobsters are immersed in fresh sea water and the sea water is thereafter aerated during transport to the lobster pound.

In an alternative method the lobsterman retrieves his catch of lobsters from the live tank on board the boat placing them in wire baskets for weighing and then placing them in the containers 10 filled with sea water and made available at dockside by the shipper or transporter.

Upon arrival at the lobster pound wharf or unloading wharf 94 the transport vehicle 60 again backs into position at the end of the wharf. Each container 10 is in turn decoupled from the aeration system and moved into position by hand truck 85 for lifting and dumping by the boom and hoist assembly mounted at the end of the truck.

As shown in FIG. 7 the saddle or harness 76 of drum dumping mechanism 75 is secured in turn to each drum and the drum is lifted from the bed of the truck and lowered to the surface of the sea water. The inverting pouring or pivoting mechanism 77 is actuated by controls 72 for inverting the drum and emptying its contents, i.e. a load of lobsters 33 into the lobster pound. An inverting drum dumper suitable for use in the system of the present invention can be obtained from Merrimack Handling Equipment Corporation, 3 Bud Way #31, Nashua, N.H. 03063, and is particularly described at page 6 of the 1981 Winter/Spring Catalog of Merrimack.

A variety of pieces of equipment may be used in the pump and machinery block 95 located at one side of the truck. For example, the compressor 53 may be driven by a 3 horse power gasoline engine. The air compressor pump itself is generally an oil free rotary vane type low pressure air compressor. In addition, the transport vehicle has been shown as a flat bed truck but might also have been shown as a trailer truck, pickup truck, flat car, or other suitable vehicle.

The invention has generally been described with reference to the use of 55 gallon (209 liters) drums modified in accordance with the present invention. Such drums can generally hold approximately 225 pounds of lobster. It is apparent however, that a variety of sizes, dimensions, and configurations can be used for the containers within the scope of the invention. Furthermore, the drums or containers may be coated or lined with an epoxy resin inside and out for corrosion resistance. Each drum may also be provided with two covers, a vent cover and a loading cover as described above. Alternatively, the fisherman or lobsterman may use the container on the lobster boat with no cover at all.

Thus, while the invention has been described with reference to particular example embodiments it is intended to cover all modifications and equivalents within the scope of the following claims.

We claim:

1. A container for bulk handling, transporting and unloading lobsters or other marine organisms immersed in an aerated water environment comprising:
    drum housing means formed with water tight base and side walls, and removable cover means formed with a vent hole, said drum housing means formed without compartments or subdivisions for filling said drum housing means with lobsters or other marine organisms in close proximity immersed in sea water, said drum housing means constructed and operatively arranged for individual handling and transport by vehicles and for unloading by upending and dumping;
    low pressure air diffuser means mounted in said drum housing means at the base for releasing diffuse low pressure air into sea water contained in the drum housing means;
    air coupling means for delivering low pressure air to the diffuser means, said air pressure sufficiently low to avoid supersaturation of the water;
    said drum housing means also formed with inlet opening and outlet opening at respective spaced apart location, said openings formed with fitting means for coupling and circulating sea water through said drum housing means.

2. The container of claim 1 wherein said removable cover means comprises a vent hole formed in the center thereof to minimize sloshing of water in the container through said vent hole.

3. The container of claim 1 wherein said removable cover means comprises ring clamp means for securing said cover means over the top of the drum housing means.

4. The container of claim 1 wherein said air coupling means comprises air hose means coupled at one end to the air diffuser means at the base of the drum housing means and having the other end thereof extending through the vent hole of said removable cover means.

5. The container of claim 1 further comprising second cover means for replacing said removable cover means, said second cover means formed with a central hole large enough to receive lobsters or other marine organisms to be stored in the container.

6. The container of claim 1 wherein said removable cover means comprises a central hole large enough to receive lobsters or other marine organisms to be stored in the container for transport, said cover means further comprising lid means pivotally mounted to the cover means for rotation between a first position covering said central hole and a second position exposing said central hole, the removable cover vent hole being formed in said lid means.

7. The container of claim 1 wherein said drum housing means is formed with a corrosion resistant lining inside and out for protection from sea water.

8. The container of claim 1 wherein said inlet opening and outlet opening are formed respectively at the bottom and top of the side walls of the drum housing means, said outlet opening also forming an overflow opening for water stored in the container.

9. The container of claim 8 wherein the base of said drum housing means is formed with drain hole means therethrough for draining said container.

10. The container of claim 1 wherein the low pressure diffuser means comprises pipe means having perforations formed along a length thereof, and a sleeve of heavy duty fabric material secured at each end to said pipe means and covering said length of perforations for diffusing and releasing air received through said perforations.

11. The container of claim 10 wherein the air coupling means comprises air hose means coupled at one end to the pipe means of the low pressure air diffuser means, said air hose means having a smaller diameter than the pipe means, thereby restrictively maintaining low level back pressure in said pipe means.

12. The container of claim 1 wherein the low pressure air diffuser means comprises a tubular porous material.

13. The container of claim 1 wherein the drum housing means is formed with saddle coupling means adjacent the center circumference thereof for lifting and inverting the container.

14. The container of claim 1 wherein said low pressure air diffuser means comprises perforated or porous tubular pipe means and wherein said air coupling means comprises air hose means coupled at one end to the tubular pipe means, said air hose means having a smaller diameter than the tubular pipe means thereby restrictively maintaining low level back pressure in said pipe means.

15. A system for containerized transport of lobsters and other marine organisms in an aerated water environment comprising:
   a plurality of containers each formed with water tight base and side walls and a removable cover with vent hole means through said cover, each container having low pressure air diffuser means mounted inside adjacent the base for releasing low pressure air into the container and first air coupling means for delivering low pressure air to the diffuser means, each container also formed with inlet opening and outlet opening at respective spaced apart locations of said containers with fitting means for coupling and circulating sea water through said container;
   truck means including a flat bed for supporting and transporting said plurality of containers in upright position, said truck means including low pressure aeration compressor means and an aeration distribution system including a plurality of second air coupling means complementary to the first air coupling means on the plurality of containers for coupling and distributing low pressure air to the diffuser means of a plurality of containers supported on the flat bed of said truck means, pivotable boom means and hoist means mounted on said truck means for lifting said containers onto and off the flat bed of said truck, said pivotable boom means including container inverting means for controlled dumping of the contents of said containers lifted by the boom means and hoist means after the cover of a container has been removed.

16. The system of claim 15 wherein said truck means further comprises sea water pumping means, seawater suction inlet and hose means for drawing in sea water, and seawater outlet hose and coupling means for coupling to a container and filling said container with sea water.

17. The system of claim 15 wherein said aeration distribution system and plurality of second air coupling means are distributed along the side of the flat bed of said truck means.

18. The system of claim 15 including means for closing each container inlet opening or outlet opening during transport of the containers on said truck means.

19. The system of claim 15 wherein each said container base, side walls and cover comprises a 55 gallon drum.

20. The system of claim 15 wherein the first air coupling means for each container comprises air hose means coupled at one end to the air diffuser means adjacent the base of the container and having the other end thereof extending through the vent hole means of the removable cover.

21. The system of claim 15 wherein each said container is provided with second cover means for replacing said removable cover while used on a lobster boat or other fishing boat, said second cover means formed with a central hole large enough to receive lobsters or other marine organisms to be stored in the container.

22. The system of claim 15 wherein said truck means is further provided with scale means for weighing said container means.

23. The system of claim 15 wherein said low pressure aeration compressor means is constructed and arranged to deliver less than one atmosphere pressure and preferably in the range of approximately $3\frac{1}{2}$ p.s.i. or less.

24. The system of claim 15 wherein said low pressure air diffuser means mounted inside each said container comprises perforated or porous tubular pipe means and wherein said first air coupling means comprise air hose means coupled at one end to the tubular pipe means, said air hose means having a smaller diameter than said tubular pipe means thereby restrictively maintaining low level back pressure in said tubular pipe means.

25. A method for handling and transporting lobsters or other marine organisms comprising:
   providing a plurality of drum like containers for holding and transporting the lobsters;
   placing the containers on lobster boats or fishing boats and filling the containers with sea water;
   placing the lobsters as they are caught by the lobsterman into the containers;
   circulating fresh sea water through the containers while they are held on the lobster boat;
   draining the drum like containers of seawater when the lobster boat is unloading at the dock;
   lifting the drained containers from the boat for transport;
   weighing each drained container full of lobsters and subtracting the weight of the container to determine the weight of the lobsters in the container;
   refilling each container with sea water after weighing;
   aerating the sea water in each container with diffuse low pressure air while the containers are transported;
   transporting the containers to a lobster pound or similar destination;
   lifting each container and lowering the container to the surface of the water; and
   inverting the container and emptying the lobsters into the lobster pound.

26. The method of claim 25 further comprising the step of returning the empty containers for reuse or storage.

27. The method of claim 25 further comprising the steps of providing a first loading cover on each container while the container is on the lobster boat or fishing boat, said first cover having a central hole large enough to receive lobsters, and providing a second transport cover on each container while the container is being transported, said second cover having a relatively small vent hole only.

28. The method of claim 25 further comprising the step of draining the container before lifting the container and lowering the container to the water surface for inverting and emptying.

29. The method of claim 25 wherein the step of aerating the sea water comprises releasing diffuse low pressure air at less than or equal to approximately $3\frac{1}{2}$ p.s.i.

30. A method for handling, transporting and unloading lobsters or other marine organisms immersed in aerated sea water from a boat at the dock to a lobster pound or similar destination comprising:
   providing a plurality of drum-like containers without compartments or subdivisions for holding and transporting lobsters in close proximity immersed in sea water, when a lobster boat or fishing boat is ready for unloading at the dock;

filling the containers with sea water to minimize sloshing during handling and loading the lobsters into the containers, substantially filling the containers with lobsters in close proximity;

aerating the sea water in each container by releasing diffuse low pressure air at the base of each container while the lobsters are held and transported in the containers, and maintaining said air at pressure sufficiently low to avoid supersaturation of the water;

transporting the containers to a lobster pound or similar destination;

lifting each container and lowering the container to the surface of the water; and, upending the container and emptying the lobsters into the lobster pound, without individual handling of the lobsters whereby the lobsters are immersed in aerating sea water during handling and transport from the dock to the lobster pound and are returned to the sea water without significant exposure to the air and without individual handling.

31. The method of claim 30 further comprising the step of weighing the lobsters before loading the lobsters into the containers.

* * * * *